United States Patent
Cheng

(10) Patent No.: US 8,155,636 B2
(45) Date of Patent: Apr. 10, 2012

(54) SYSTEMS AND METHODS FOR REMOTELY CONTROLLING MOBILE STATIONS

(75) Inventor: Jing Ru Cheng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1050 days.

(21) Appl. No.: 11/381,753

(22) Filed: May 5, 2006

(65) Prior Publication Data

US 2007/0259657 A1 Nov. 8, 2007

(51) Int. Cl.
*H04M 3/00* (2006.01)

(52) U.S. Cl. .............. 455/419; 370/261; 370/395.21

(58) Field of Classification Search .......... 455/419, 455/416, 420, 14.1; 370/259–261
See application file for complete search history.

(56) References Cited

U.S. PATENT DOCUMENTS

| | | | | |
|---|---|---|---|---|
| 5,414,750 | A * | 5/1995 | Bhagat et al. | 455/416 |
| 5,712,901 | A * | 1/1998 | Meermans | 379/88.14 |
| 6,753,869 | B2 | 6/2004 | Andres et al. | |
| 7,317,919 | B1 * | 1/2008 | Ruf | 455/446 |
| 2003/0003907 | A1 | 1/2003 | Lai et al. | |
| 2004/0198335 | A1 | 10/2004 | Campen et al. | |
| 2005/0149564 | A1 | 7/2005 | Jain et al. | |
| 2005/0159175 | A1 | 7/2005 | Zhou et al. | |
| 2005/0215245 | A1 * | 9/2005 | Tian et al. | 455/422.1 |
| 2005/0259618 | A1 * | 11/2005 | Ahya et al. | 370/331 |
| 2006/0002340 | A1 * | 1/2006 | Criss et al. | 370/328 |
| 2006/0095501 | A1 | 5/2006 | Mochida | |
| 2006/0234703 | A1 * | 10/2006 | Wuthnow et al. | 455/433 |
| 2007/0190995 | A1 * | 8/2007 | Wang et al. | 455/419 |
| 2007/0258422 | A1 * | 11/2007 | Herrmann | 370/338 |

FOREIGN PATENT DOCUMENTS

| | | |
|---|---|---|
| CN | 1585447 | 2/2005 |
| CN | 1596007 | 3/2005 |
| EP | 1170969 | 9/2002 |
| EP | 1271903 | 9/2004 |
| TW | 508932 | 11/2002 |
| WO | WO 02/102035 A2 * | 12/2002 |
| WO | W02005083999 | 9/2005 |

OTHER PUBLICATIONS

German Office Action mailed Apr. 19, 2007.
Interoperability Specification (IOS) for CDMA 2000 Access Network Interfaces—Part 4 (A1, A2, and A5 Interfaces), Nov. 16, 2001 (Table of Contents and pp. 213-214).
GSM Switching, Services and Protocols, 2001 (Table of Contents and pp. 57-61).
3rd Generation Partnership Project; Technical Specification Group Core Network and Terminals; Mobile radio interface Layer 3 specification; Core network protocols; Stage 3, Jun. 2008 (Table of Contents and pp. 35-52).
3rd Generation Partnership Project; Technical Specification Group Core Network and Terminals; Mobile radio interface Layer 3 specification; Core network protocols; Stage 3, Jun. 2008 (pp. 274, 375-397, 412-413).

* cited by examiner

*Primary Examiner* — Marcos Batista
(74) *Attorney, Agent, or Firm* — Thomas|Kayden

(57) ABSTRACT

Methods for remotely controlling a mobile station by a controller are provided. An embodiment of a method performed by the mobile station comprises the following steps. An action request comprising a remote control instruction issued by the controller is received. The remote control instruction is acquired from the received action request. The remote control instruction is executed to activate or deactivate a particular function resident on the mobile station or return data stored by the mobile station. The action request is received through a wireless network.

27 Claims, 11 Drawing Sheets

| Function code | Brief description |
|---|---|
| 121 | Insert a record into phonebook |
| 122 | Delete a record from phonebook |
| 123 | Copy a record in phonebook |
| 124 | Check memory status for phonebook |
| 131 | Activate incoming call forwarding |
| 132 | Deactivate incoming call forwarding |
| 133 | Activate automated answering of incoming calls |
| 134 | Deactivate automated answering of incoming calls |

FIG. 6

| IEI | Information element | Presence | Format | Length |
|---|---|---|---|---|
| | Call control protocol discriminator | M | V | 1/2 |
| | Transaction identifier | M | V | 1/2 |
| | Setup message type | M | V | 1 |
| D- | BC repeat indicator | C | TV | 1 |
| 04 | Bearer capability 1 | M | TLV | 3-16 |
| 04 | Bearer capability 2 | O | TLV | 3-16 |
| 1C | Facility (simple recall alignment) | O | TLV | 2- |
| 5D | Calling party sub-address | O | TLV | 2-23 |
| 5E | Called party BCD | M | TLV | 3-43 |
| 6D | Called party sub-address | O | TLV | 2-23 |
| D- | LLC repeat indicator | O | TLV | 1 |
| 7C | Low layer compatibility I | O | TLV | 2-18 |
| 7C | Low layer compatibility II | O | TLV | 2-18 |
| D- | HLC repeat indicator | O | TLV | 1 |
| 7D | High layer compatibility I | O | TLV | 2-5 |
| 7D | High layer compatibility II | O | TLV | 2-5 |
| 7E | User-user | O | TLV | 3-35 |

SYSTEMS AND METHODS FOR REMOTELY CONTROLLING MOBILE STATIONS

BACKGROUND

The invention relates to mobile stations, and more particularly, to systems and methods for remotely controlling mobile stations.

A conventional mobile station typically provides a man-machine interface (MMI), facilitating user activation or deactivation of various functions such as incoming call forwarding, automated answering of incoming calls, automated transferring to an audio mail box, photographing, audio recording, video recording, teleconferencing, mobile station lock, personal identification number (PIN) lock, status reporting and powering off. Users may also browse data such as memo notes, schedules, a phonebook, short messages and emails, stored in the mobile station via the MMI. When a mobile station is left inaccessible to the user, however, it is difficult to activate or deactivate the described functions or acquire data thereof.

SUMMARY

Methods for remotely controlling a mobile station by a controller are provided. An embodiment of a method performed by the mobile station comprises the following steps. An embodiment of a method for remotely controlling a mobile station by a controller comprises the following steps. An action request comprising a remote control instruction issued by the controller is received. The remote control instruction is acquired from the received action request. The remote control instruction is executed to activate or deactivate a particular function resident on the mobile station or return data stored by the mobile station. The action request is received through a wireless network.

An embodiment of a method performed by the mobile station comprises the following steps. A remote control instruction is provided. An action request comprising the remote control instruction is transmitted to the mobile station, directing the mobile station to execute the remote control instruction. The action request is transmitted via a wireless network.

Systems for remote mobile station control are provided. An embodiment of a system comprises a controller and a mobile station coupling thereto via a wireless network. The mobile station receives an action request comprising a remote control instruction issued by the controller, acquires the remote control instruction from the received action request and executes the remote control instruction to activate or deactivate a particular function resident on the mobile station or return data stored by the mobile station. The action request is received through the wireless network.

BRIEF DESCRIPTION OF THE DRAWINGS

The present invention can be more fully understood by reading the subsequent detailed description and examples with references made to the accompanying drawings, wherein:

FIG. 6 is a diagram of an exemplary function code mapping table;

FIG. 7 is a diagram of message content of a conventional CC setup message;

DETAILED DESCRIPTION

Figure 1:
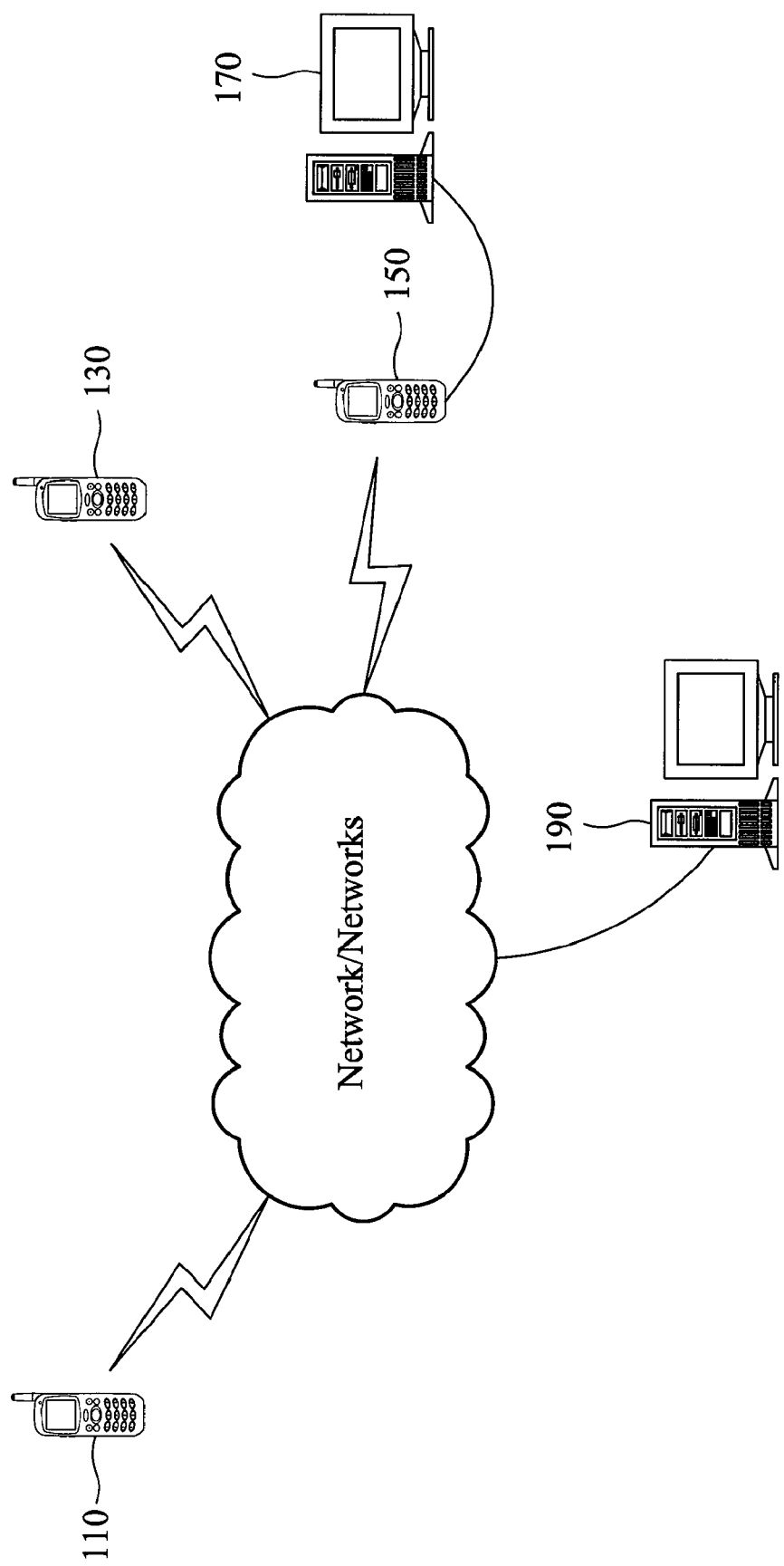
FIG. 1 is a diagram of network environment of an embodiment of a system containing mobile stations and computers.

Systems for remotely controlling mobile stations are provided. FIG. 1 is a diagram of network environment of an embodiment of a system containing mobile stations 110, 130 and 150, computers 170 and 190 connecting therebetween via one or more networks. The network may be a global system for mobile communications (GSM), enhanced data rates for global evolution (EDGE) or code division multiple access (CDMA) network, general packet radio service (GPRS) network, Internet or similar. Those skilled in the art will recognize that the mobile stations 110, 130 and 150, computers 170 and 190 may be connected in different types of networking environments, and communicate therebetween through various types of transmission devices such as routers, gateways, access points, base station systems (BSS) or others. Note that, various gateways established between heterogeneous networks, such as between GSM network and Internet or similar, enabling messages to be transmitted therebetween. The mobile station may be a mobile phone, personal digital assistant (PDA), smart phone, portable media player (PMP) or similar. The computer may be a personal computer, a workstation, a notebook, a mainframe, a mini-computer, a network computer or similar.

The mobile station 130, computers 170 and 190 operating as controllers issue control instructions and parameters corresponding to the control instructions (if required) via various bearers such as call control (CC) setup messages set forth by 3GPP TS 24.008 version 5.5.0 release 5 in September 2002, short messages, extended messages, multimedia messages, e-mails, files or similar, to the mobile station 110 in order to control the mobile station 110. The mobile station 150 operates as an intermediary device for transferring control instructions issued by the computer 170 to the mobile station 110. The issued control instructions may contain information directing the mobile station 110 to activate or deactivate functions thereof. Such functions may contain incoming call forwarding, automated answering of incoming calls, automated transferring to an audio mail box, photographing, audio recording, video recording, teleconferencing, mobile station lock, personal identification number (PIN) lock, status reporting, powering off or similar. When activating the status reporting function and detecting an incoming short message, extended message, multimedia message, a missing call or similar, the mobile station 110 sends a corresponding status message to one of the mobile station 130 and computers 170 and 190, carried by an email, short message, multimedia message, file, mobile originating (MO) call or similar. The status message prompts that an incoming short message, extended message, multimedia message, a missing call or similar, has been detected by the mobile station 110. More-over, the issued control instructions may contain information directing the mobile station 110 to retrieve and reply with particular data stored therein, such as memo notes, schedules, a phonebook, short messages, emails or similar. The mobile station 110 operating as a controlled device receives control instructions and parameters corresponding to the control instructions (if required) carried by bearers, and subsequently executes the received control instructions with corresponding parameters.

Figure 2:
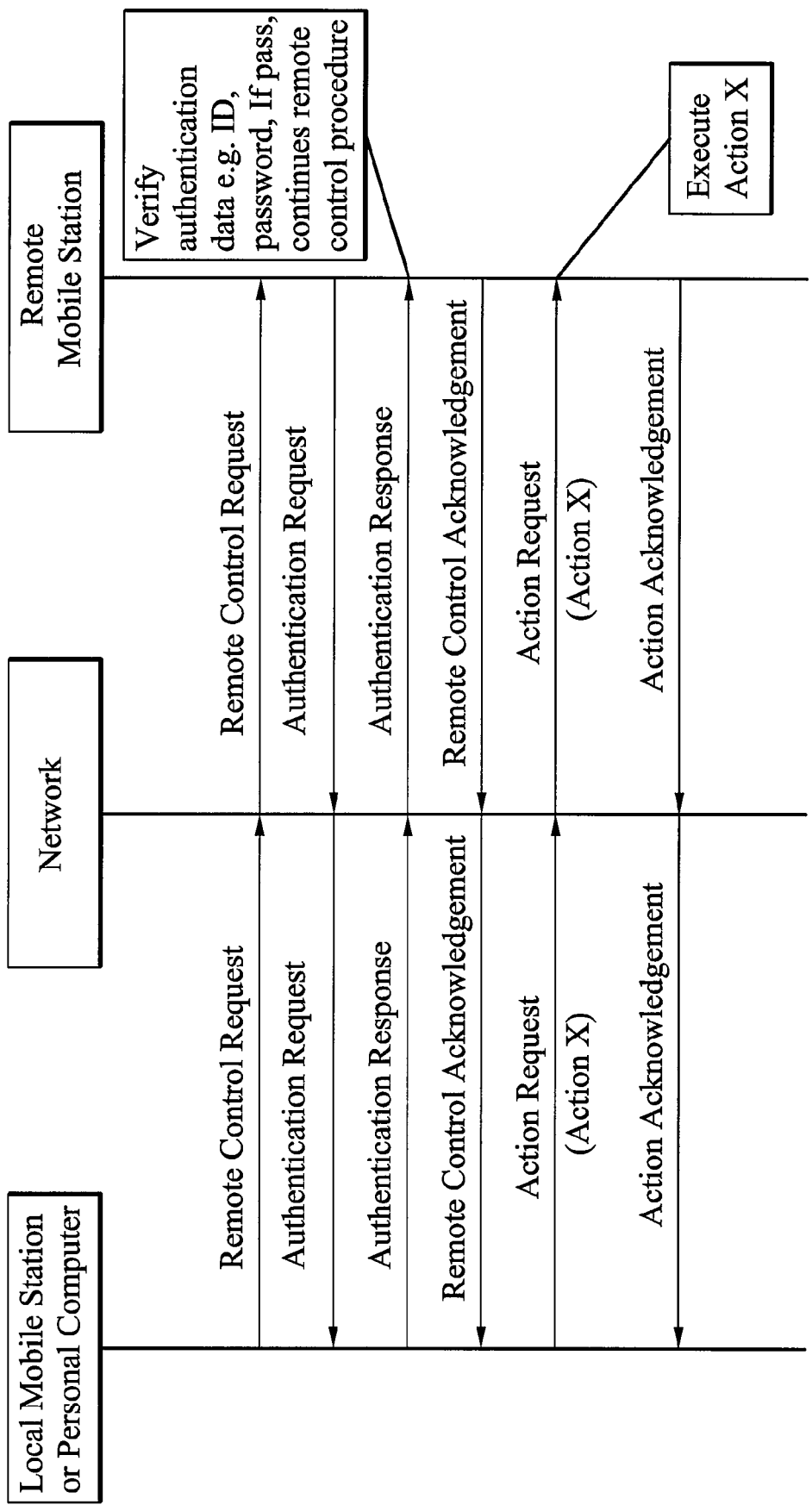
FIG. 2 is a sequence diagram showing an embodiment of remote control protocol.

FIG. 2 is a sequence diagram showing an embodiment of a remote control protocol performed between a local mobile station or computer and a remote mobile station. For example, the local one may be the mobile station 130, the computer 170 with the mobile station 150, the mobile station 190, or similar, and the remote mobile station may be the mobile station 110. The local mobile station or computer transmits a remote control request to the remote mobile station via one or more networks. The transmitted remote control request notifies the remote mobile station that a remote control procedure is initiated by the local mobile station or computer. After receiving the remote control request, the remote mobile station transmits an authentication request to the local mobile station or computer via one or more networks. The transmitted authentication request asks the local mobile station or computer to provide relevant authentication data. After receiving the authentication request, the local mobile station or computer transmits an authentication response with relevant authentication data such as ID and/or password to the remote mobile station. After receiving the authentication response, the remote mobile station verifies the authentication data therewith and determines whether the remote control procedure is authenticated. If the remote control procedure is authenticated, the remote mobile station transmits a remote control acknowledgement to the local mobile station or computer. The transmitted remote control acknowledgement notifies the local mobile station or computer that the remote control procedure is authenticated. After receiving the remote control acknowledgement, the local mobile station or computer transmits an action request containing one or more remote control instructions and corresponding parameters to the remote mobile station. After receiving the action request, the remote mobile station executes remote control instructions with the corresponding parameters in the action request. When successfully executing the remote control instructions with the corresponding parameters, the remote mobile station transmits an action acknowledgement to the local mobile station or computer. The transmitted action acknowledgement notifies the local mobile station or computer that the issued remote control instructions with the corresponding parameters are successfully executed.

Figure 3:
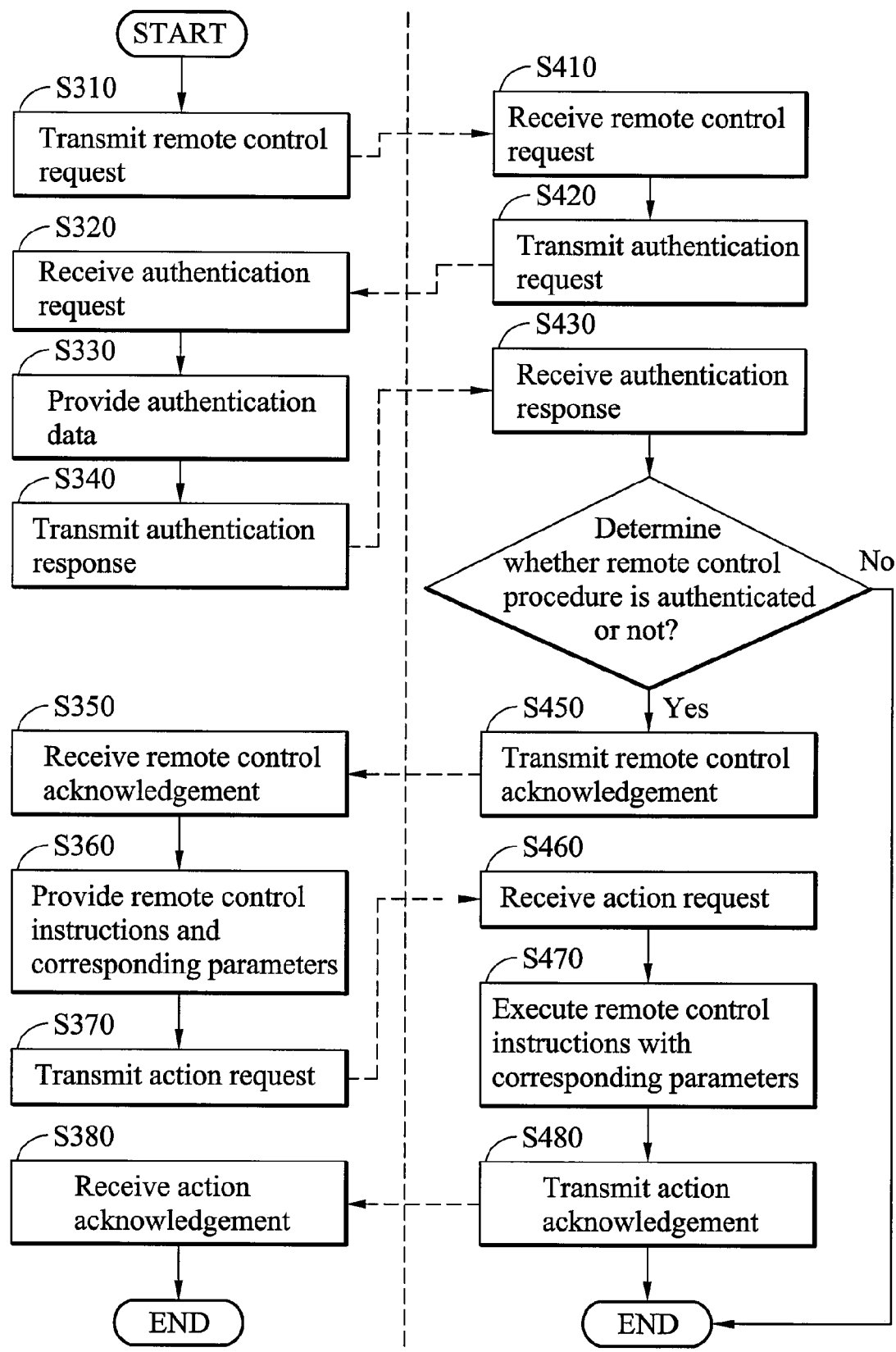
FIG. 3 is a flowchart illustrating an embodiment of a method for remotely controlling mobile stations.

FIG. 3 is a flowchart illustrating an embodiment of a method for remotely controlling mobile stations, divided into two sections, a left section showing steps performed by a local mobile station or computer (i.e. a controller), and a right section showing steps performed by a remote mobile station (i.e. a device to be controlled), separated by dashed lines for added clarity. A remote control request is transmitted by the local mobile station or computer (step S310), and is received by the remote mobile station (step S410). The remote control request indicates that a remote control procedure is initiated by a local mobile station or computer. An authentication request corresponding to the received remote control request is transmitted by the remote mobile station (step S420), and is received by the local mobile station or computer (step S320). The authentication request indicates that an authentication procedure is initiated for the remote control procedure. Authentication data such as an identification (ID) and/or a password, is provided (step S330). The ID may be a personal identification number (PIN) or a phone number identifying the local mobile station, or an Internet protocol (IP), medium access control (MAC) address identifying the local mobile station or computer, or a proprietary remote control ID identifying the local mobile station or computer, recognized by the remote mobile station. The ID and password may be retrieved from a storage device of the local mobile station or computer, or input via a graphical user interface (GUI) man-machine interface (MMI), textual interface or similar. Note that step S330 may be performed prior to step S320.

An authentication response corresponding to the received authentication request and containing the provided authentication data is transmitted by the local mobile station or computer (step S340), and is received by the remote mobile station (step S430). The remote mobile station determines whether the remote control procedure is authenticated or not by verifying the authentication data therein (step S440). If so, a remote control acknowledgement corresponding to the received authentication response is transmitted by the remote mobile station (step S450) otherwise, the process ends. The remote mobile station may verify whether the received ID is authenticated to perform the remote control, and/or the received password corresponding to the ID is a correct password. After receiving the remote control acknowledgement by the local mobile station or computer (step S350), remote control instructions and corresponding parameters is provided (step S360). Step S360 may further provide a GUI, MMI, textual interface or similar, facilitating interaction with the input of the remote control instructions and corresponding parameters. The provided GUI or MMI may further provide a tree view or a menu to facilitate user selection and browsing for the specific remote control instruction. The details of remote control instruction representation are to be described in the following paragraphs and briefly described herein. Note that step S360 may be performed prior to step S350. An action request containing the provided remote control instructions and corresponding parameters is transmitted by the local mobile station or computer (step S370), and is received by the remote mobile station (step S460). After successfully executing the remote control instructions and corresponding parameters by the remote mobile station, an action acknowledgement is transmitted by the remote mobile station (step S480), and is received by the local mobile station or computer (step S380). Note that one or more remote control messages such as the remote control request, authentication request, authentication response, remote control acknowledgement, action request and/or action acknowledgement, are carried by a bearer such as a CC setup message, short message, extended message, multimedia message, e-mail, data file or similar, and are delivered to a destination via the bearer. The details of bearer are to be described in the following paragraphs and briefly described herein.

Figure 4:
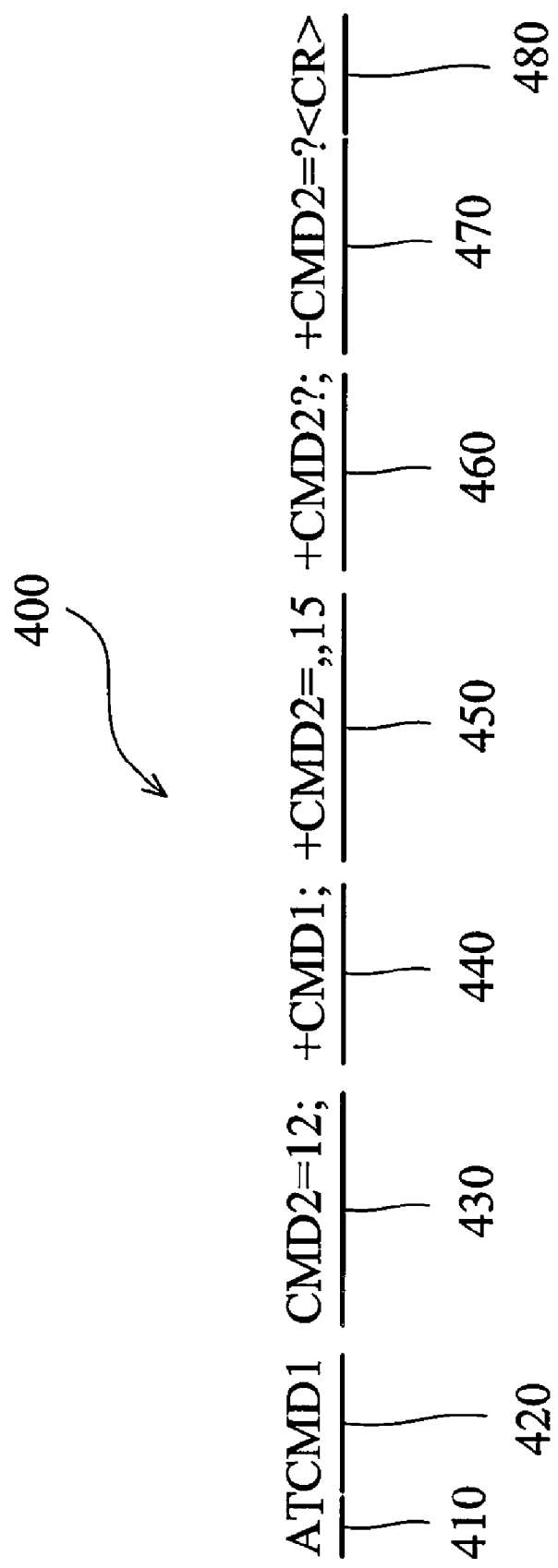
FIG. 4 is a diagram of general structure of an AT command line.

Referring to step S370, the remote control instructions and corresponding parameters may be encoded in various formats such as AT commands set forth by 3GPP TS 27.007 version 5.1.0 release 5 in March 2002, menu traversal paths, functions codes, voice data, dual-tone multi-frequency (DTMF) signals or similar. Remote control instructions and corresponding parameters may be encoded in AT commands. FIG. 4 is a diagram of the general structure of an AT command line 400. The AT command line starts with a prefix "AT" 410 and ends with termination characters "<CR>" 470. Basic AT commands such as 420 and 430, are delimited with semicolon. Extended AT commands are prefixed with "+", such as 440, 450 and others, and delimited with semicolon. The basic or extended AT command may have one or more subparameters separated by commas, such as 430 and others. The command line 400 may contain a read command trailing "?", such as 460, for checking current subparameter values for an AT extended command. The command line 400 may contain a test command trailing "=?", such as 470, for checking possible subparameter values for an AT extended command. Referring to step S360 of FIG. 3, the remote control instructions and corresponding parameters may be encoded in the AT command line. Referring to step S470 of FIG. 3, the AT command line may be parsed by an AT parser to acquire the remote control instructions and corresponding parameters therefrom, and the acquired remote control instructions are executed with the extracted corresponding parameters.

Figure 5:
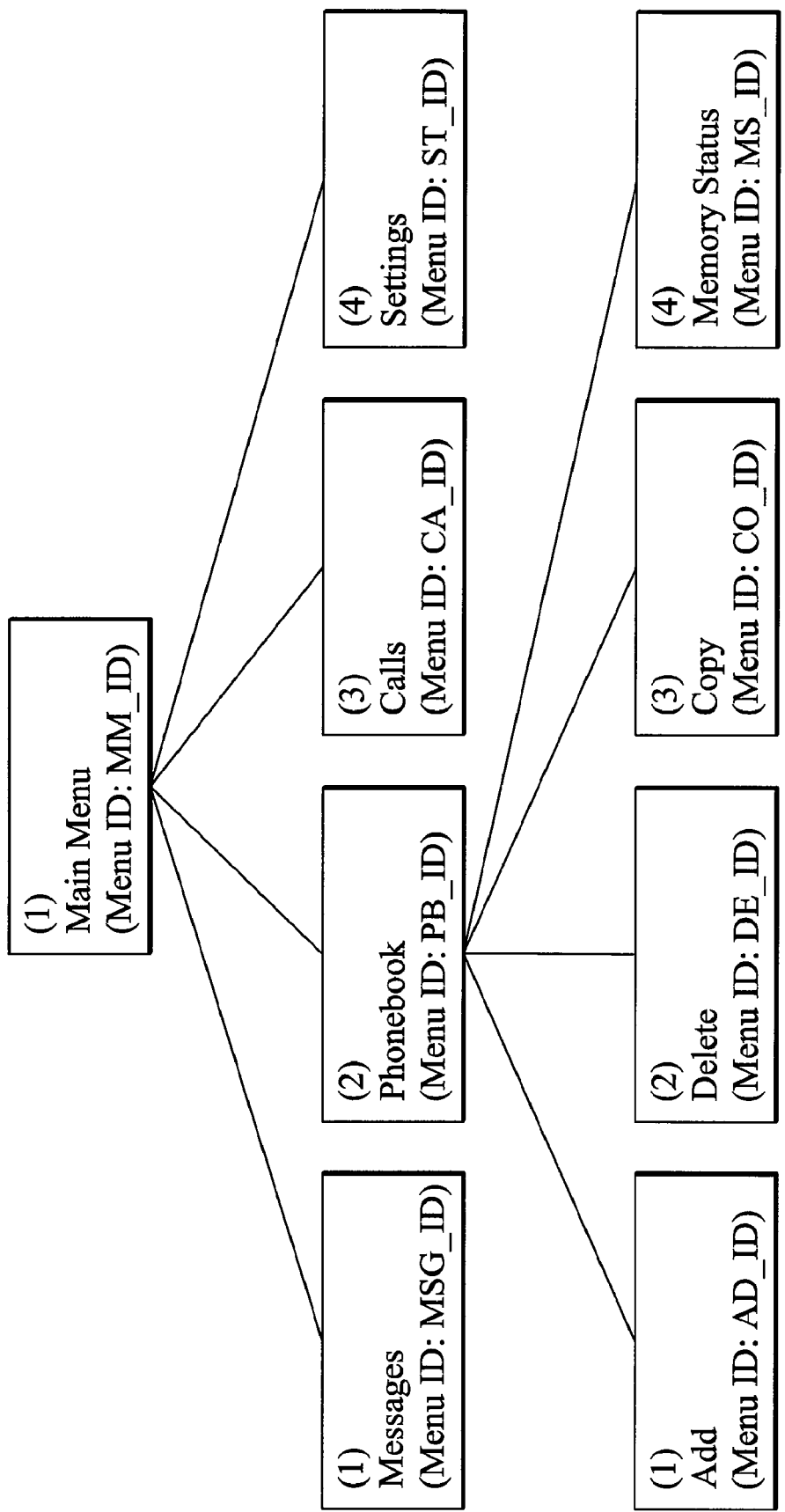
FIG. 5 is a diagram of tree structure for an exemplary menu.

Remote control instructions may be organized into a menu tree. FIG. 5 is a diagram of a tree structure for an exemplary menu. A menu "Main Menu" with a sequence number "1" and a menu ID "MM_ID" contains four menu items "Messages", "Phonebook", "Calls" and "Settings" in sequence, respectively with menu IDs "MSG_ID", "PB_ID", "CA_ID" and "ST_ID". The menu item "Phonebook" with a sequence number "2" and a menu ID "PB_ID" contains four menu items (i.e. remote control instructions) "Add", "Delete", "Copy" and "Memory Status" in sequence, respectively with menu IDs "AD_ID", "DE_ID", "CO_ID" and "MS_ID". The remote control instruction may be represented by a menu traversal path. For example, when desiring to delete a record of a phonebook stored by a mobile station to be controlled, the remote control instruction may be represented by a menu traversal path "1→2→2" containing a series of sequence numbers eliminated with "→", "MM_ID→PB_ID→DE_ID" containing a series of menu IDs separated by "→" or similar. Referring to step S360 of FIG. 3, the remote control instructions may be encoded by a menu traversal path, and, if required, corresponding parameters are added following the menu traversal path. Referring to step S470 of FIG. 3, the menu traversal path may be parsed to acquire the remote control instructions, and the acquired remote control instructions are executed with corresponding parameters.

Remote control instructions may be represented by a function code. FIG. 6 is a diagram of an exemplary function code mapping table. Function codes "121" to "124" associate with operations for a phonebook stored in a mobile station and respectively direct the mobile station to insert a record into the phonebook, delete a record from the phonebook, copy a record of the phonebook and check the memory status of the phonebook. Function codes "131" to "134" associate with operations for incoming calls and respectively direct a mobile station to activate and deactivate incoming call forwarding, activate and deactivate automated answering of incoming calls. Referring to step S360 of FIG. 3, the remote control instructions may be encoded by a function code, and, if required, corresponding parameters are added following the function code. Referring to step S470 of FIG. 3, the function codes may be parsed to acquire the remote control instructions, and the acquired remote control instructions are executed with corresponding parameters.

Remote control instructions and corresponding parameters may be contained in digital voice data such as pulse code modulation (PCM), adaptive multi-rate (AMR) data or similar, recognized by a mobile station to be controlled (e.g. 110 of FIG. 1). Referring to step S360 of FIG. 3, real-world audio signals corresponding to remote control instructions and corresponding parameters may be received via a microphone of a controller (e.g. mobile station 130 or 150, or computer 170 or 190 of FIG. 1), and converted into digital voice data, and subsequently, referring to step S370 of FIG. 3, the converted digital voice data is transmitted to a remote mobile station. Thereafter, referring to step S470 of FIG. 3, the remote mobile station may recognize and execute remote control instructions with corresponding parameters according to the received voice data. For example, real-world audio signals "Call forward" and a particular phone number are received via a microphone of a controller, and converted into PCM data, thereafter, a remote control instruction and the provided phone number are recognized and executed. It is to be understood that a mobile station to be controlled may store multiple predefined voice patterns corresponding to remote control instructions and parameters, and, a remote control instruction or a parameter is recognized by comparing the stored voice patterns with the received voice data using well-known speech recognition algorithms.

A DTMF remote control system may be established in a mobile station to be controlled (e.g. 110 of FIG. 1), instructing users to perform remote control. Referring to steps S310 and S410, the remote control request may contain DTMF signals corresponding to a combination of key strokes such as "0", "*" and "#", on a keypad of a controller. Referring to steps S420 and S320, the authentication request may contain voice data to be played by a controller (e.g. mobile station 130 or 150, or computer 170 or 190 of FIG. 1) for requesting authentication data. Referring to step S330, DTMF signals corresponding to an ID and/or a password may be provided. Referring to steps S450 and S350, the remote control acknowledgement may contain voice data to be played by a controller for requesting remote control instructions and corresponding parameters. Referring to steps S370 and S460, the action request may contain DTMF signals corresponding to a remote control instruction and corresponding parameters, and, a remote control instruction or corresponding parameter may be acquired by detecting the DTMF signals.

One or more remote control messages such as the described remote control requests, authentication requests, authentication responses, remote control acknowledgements, action requests and action acknowledgements, may be carried by a CC setup message. The CC setup message is typically sent from the mobile station 130 or 150 (FIG. 1) to the mobile station 110 (FIG. 1), and vice versa, to initiate a mobile originating call establishment. The CC setup message may contain the described ID, password, AT commands, menu traversal paths, function codes or corresponding parameters. FIG. 7 is a diagram of message content of a conventional CC setup message, in which a calling party sub-address field C710, a called party sub-address field C730 and a user-user field C750 are reserved and respectively stored calling party sub-address, called party sub-address and user-to-user information. One or more remote control messages are preferably encoded in the calling party sub-address field C410, called party sub-address field C730 or user-user field C750.

One or more remote control messages may be carried by a short message (SM) and transmitted via multiple intermediary devices supporting short message service (SMS). Short messages being short text messages are transmitted to and from a mobile station, a fax machine or a computer with an IP address. The SM may contain the described ID, password, AT commands, menu traversal paths, function codes or corresponding parameters. The SM is typically shorter than predetermined alphanumeric characters such as 160 or less, and contains no images or graphics. When the SM is sent, it is received by a short message service center (SMSC), which then delivers it to a mobile station, a fax machine or an electronic machine with an IP address. The SMSC may send a short message service (SMS) request to a home location register (HLR) to find the mobile station. When the HLR receives the request, the subscriber status corresponding to the mobile station is sent to the SMSC, the response comprising whether the mobile station is "inactive" or "active", and where the mobile station is roaming. If the response is "inactive", the SMSC holds the message for a period of time. When detecting that the mobile station has associated with a wireless network, the HLR sends an SMS notification to the SMSC, and the SMSC attempts to deliver the held SM to the mobile station.

One or more remote control messages may be carried by an enhanced message (EM) and transmitted via multiple intermediary devices supporting enhanced message service (EMS). The EMS is an application-level extension to SMS for mobile stations available on wireless networks. The EM may contain the described ID, password, AT commands, menu traversal paths, function codes, corresponding parameters or audio data corresponding to remote control instructions or parameters and enclosed in a digital file such as ".pcm", ".wav", ".amr" or similar. A mobile station to be controlled receives the EM further having special text formatting (such as bold or italic), animations pictures icons, sound effects and special ring tones. The EM is delivered to a mobile station to be controlled via various intermediary devices supporting enhanced message service (EMS).

One or more remote control messages may be carried by a multimedia message (MM) and transmitted via multiple intermediary devices supporting multimedia message service (MMS). The MM may contain the described ID, password, AT commands, menu traversal paths, function codes, corresponding parameters or audio data corresponding to remote control instructions or parameters and enclosed in a digital file such as ".pcm", ".wav", ".amr" or similar. The MM may further contain graphics, video clips, sound files and short text messages over wireless and/or wired networks using the wireless application protocol (WAP). The MM is typically delivered to a mobile station to be controlled via MMS Centers (MMSCs). MMS is typically based on the concept of multimedia messaging. The presentation of the MM is coded into a presentation file so that the images, audio and text are displayed or played back in a predetermined order as one single message. MMS does not support attachments as e-mail does.

One or more remote control messages may be carried by a text message or a file attachment of an e-mail. The e-mail may contain the described ID, password, AT commands, menu traversal paths, function codes, corresponding parameters or audio data corresponding to remote control instructions or parameters and enclosed in the attached digital files such as ".pcm", ".wav", ".amr" or similar. The e-mail is transmitted via a message transfer agent (MTA) resident on a remote host, and received via a mail user agent (MUA) resident on a mobile station to be controlled or a controller. The MTA, also called a mail server or a mail exchange server, is a computer program or software agent transferring the e-mail from the mobile station to the controller, and vice versa. The MUA contacts the MTA for actual delivery of the mail. The MTA may be configured to support simple mail transfer protocol (SMTP) and/or multipurpose Internet mail extensions (MIME) SMTP is typically designed for only plain text (ASCII text), but MIME or similar enables executable programs and multimedia files to be attached to and transported with the e-mail.

One or more remote control messages may be carried by a data file such as a text file, a binary file, an audio file or similar, and transmitted via multiple intermediary devices supporting file transfer protocol (FTP). The data file may contain the described ID, password, AT commands, menu traversal paths, function codes, corresponding parameters or audio data corresponding to remote control instructions or parameters. Note that, when employing FTP, a mobile station to be controlled must provide an Internet protocol (IP) address as its address for delivery of data files.

One or more remote control messages may be carried by digital text in universal multiple-octet coded character set (USC), Baudot type character set or similar. The digital text may contain the described ID, password, AT commands, menu traversal paths, function codes, corresponding parameters or audio data corresponding to remote control instructions or parameters. A mobile station to be controlled or a controller is equipped with a cellular text telephone modem (CTM) set forth by set forth by 3GPP TS 26.230 version 5.0.2 release 5 in July 2004 to receive the digital text via the speech channel of networks.

Figure 8:
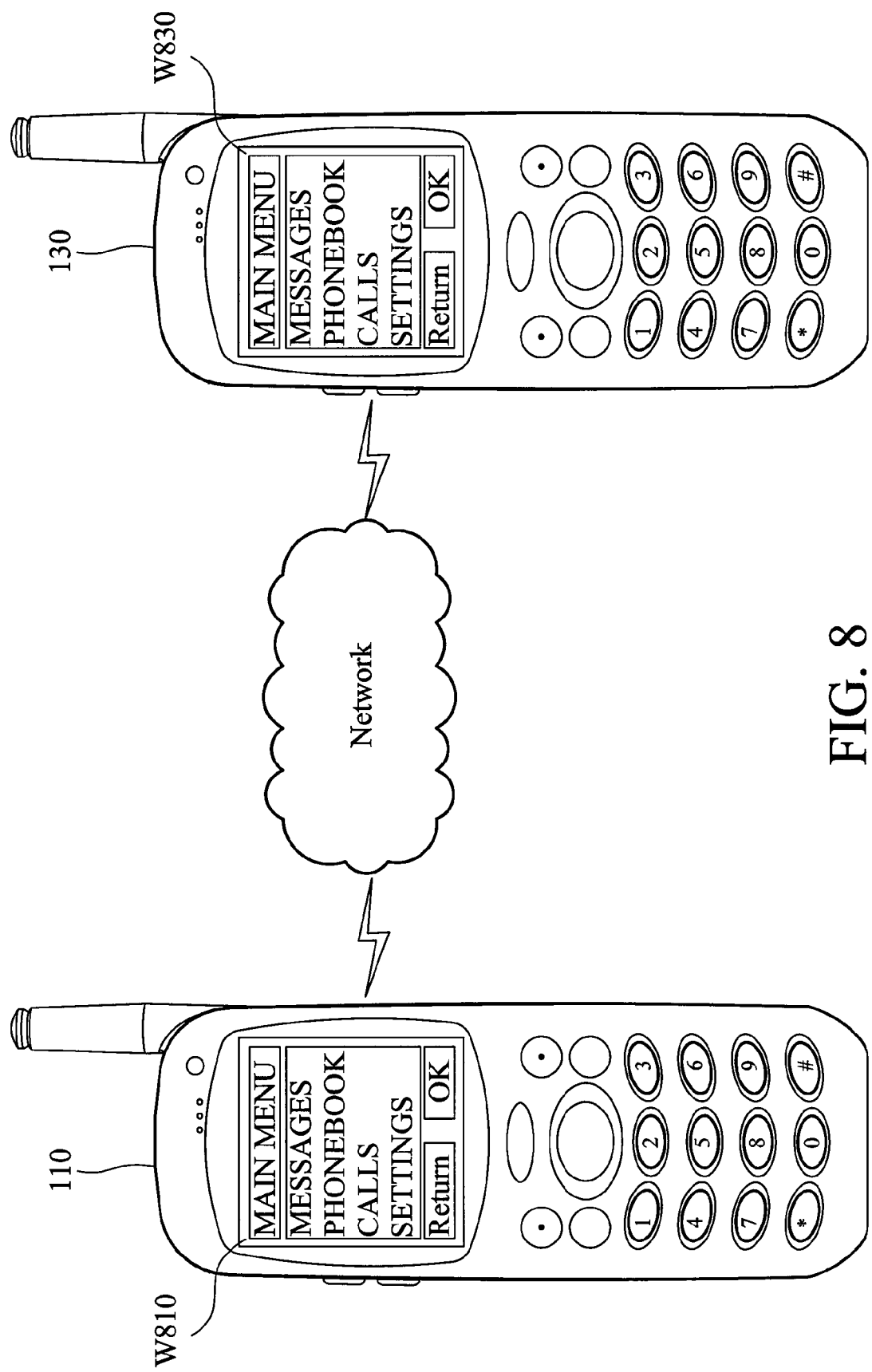
FIG. 8 is a diagram showing two screens of mobile stations respectively displaying two exemplary MMIs.
Figure 9:
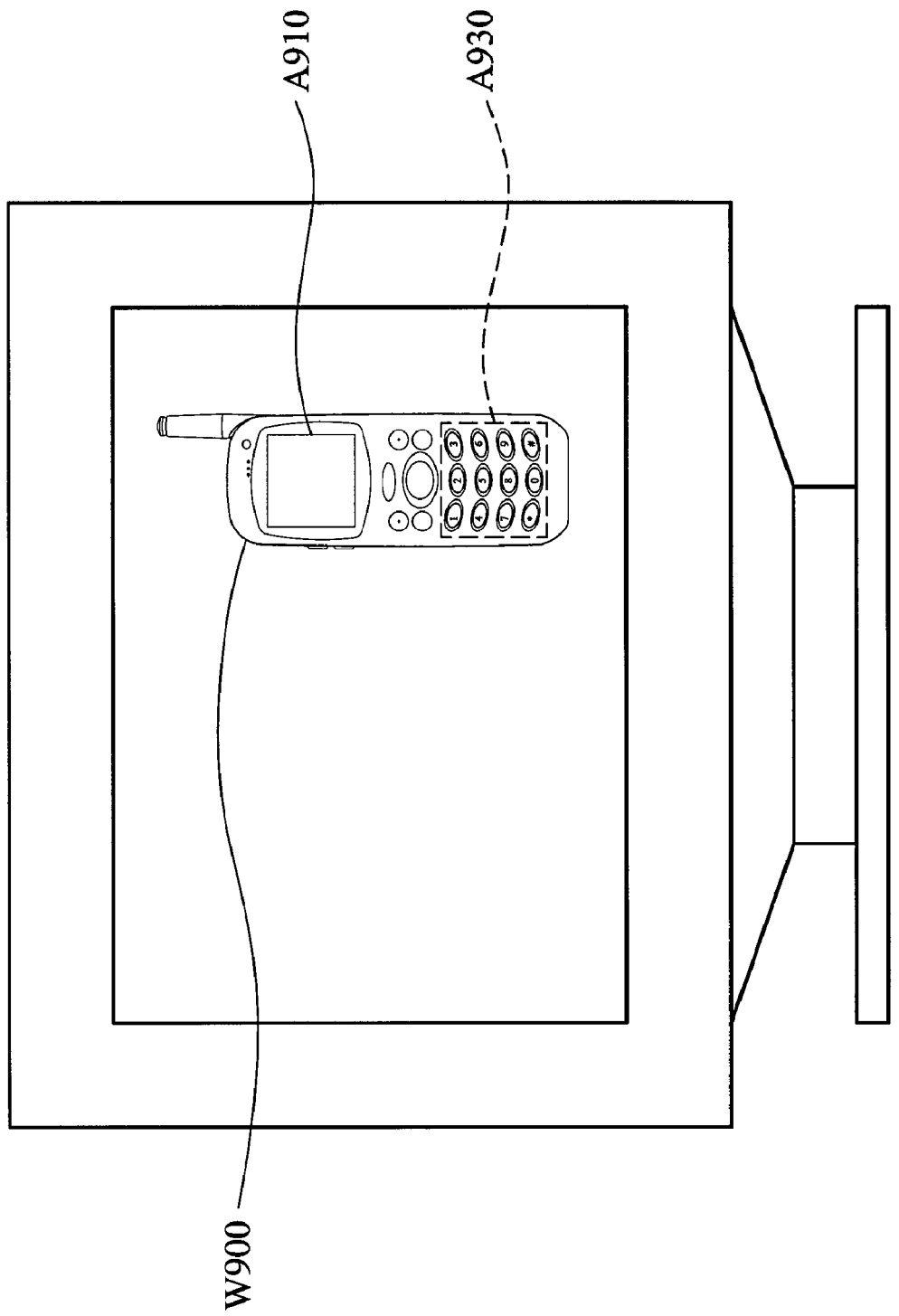
FIG. 9 is a diagram of an exemplary interface displayed on a screen of a computer.

In some embodiments, referring to steps S450 and S350, after the remote control procedure is authenticated, image data corresponding to an MMI displayed on a screen of a mobile station to be controlled (e.g. 110 of FIG. 1) may be further transmitted to a controller (e.g. mobile station 130 or 150, or computer 170 or 190 of FIG. 1). After that, the controller displays an MMI on a screen thereof according to the received image data, facilitating users to provide remote control instructions and corresponding parameters by interacting with the displayed MMI. For example, FIG. 8 is a diagram showing two screens of mobile station 110 and mobile station 130 respectively displaying two exemplary MMIs W810 and W830. Remote control instructions and corresponding parameters may be provided by interacting with the displayed MMI on the mobile station 130. FIG. 9 is a diagram of an exemplary interface W900 displayed on a screen of a computer. The interface W900 simulating appearance of the mobile station 110 comprises two areas: a screen area A910 and a keypad area A930. The screen area A910 displays an MMI corresponding to the MMI W810 of FIG. 8. Remote control instructions and corresponding parameters may be provided by interacting with the displayed MMI on the screen area A910 and the keypad area A930.

In addition to local applications providing the interface W900, an operator may perform such remote controls via a Website. The Website may provide a logon interface (e.g. a logon Web page), facilitating input of the described authentication data (step S330 of FIG. 3), and subsequently operates as a logon agent and delivers the authentication data to a mobile station to be controlled (step S340 of FIG. 3). After the remote control procedure is authenticated (step S350 of FIG. 3), the Website may further provide a remote control interface (e.g. a input Web page) facilitating input of remote control instructions and corresponding parameters (step S360 of FIG. 3), and subsequently generates and delivers the described action requests to the mobile station (step S370 of FIG. 3).

Figure 10A:
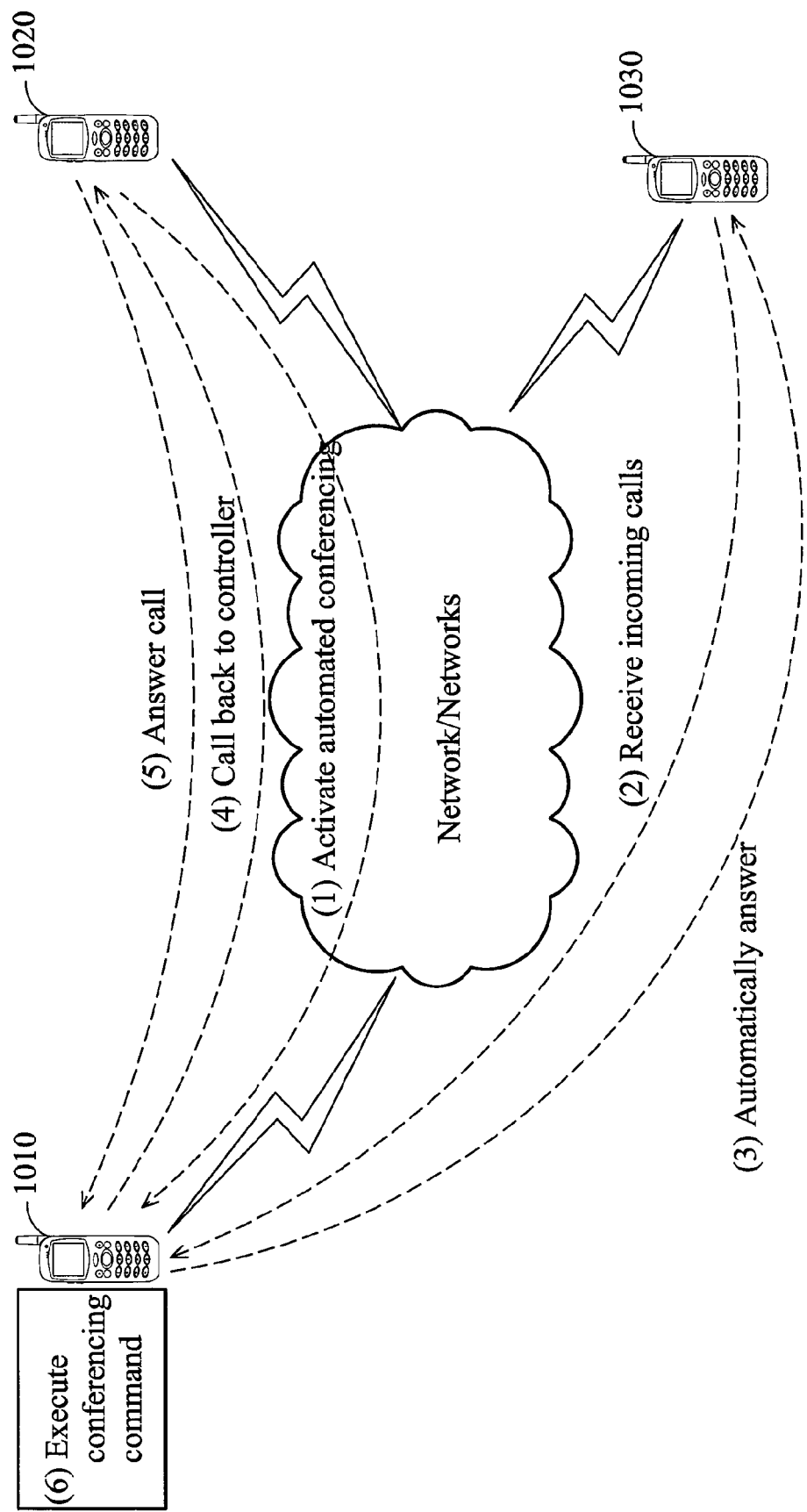
FIGS. 10*a* and 10*b* are diagrams illustrating exemplary scenarios for activating a remote mobile station to start a conferencing procedure.
Figure 10B:
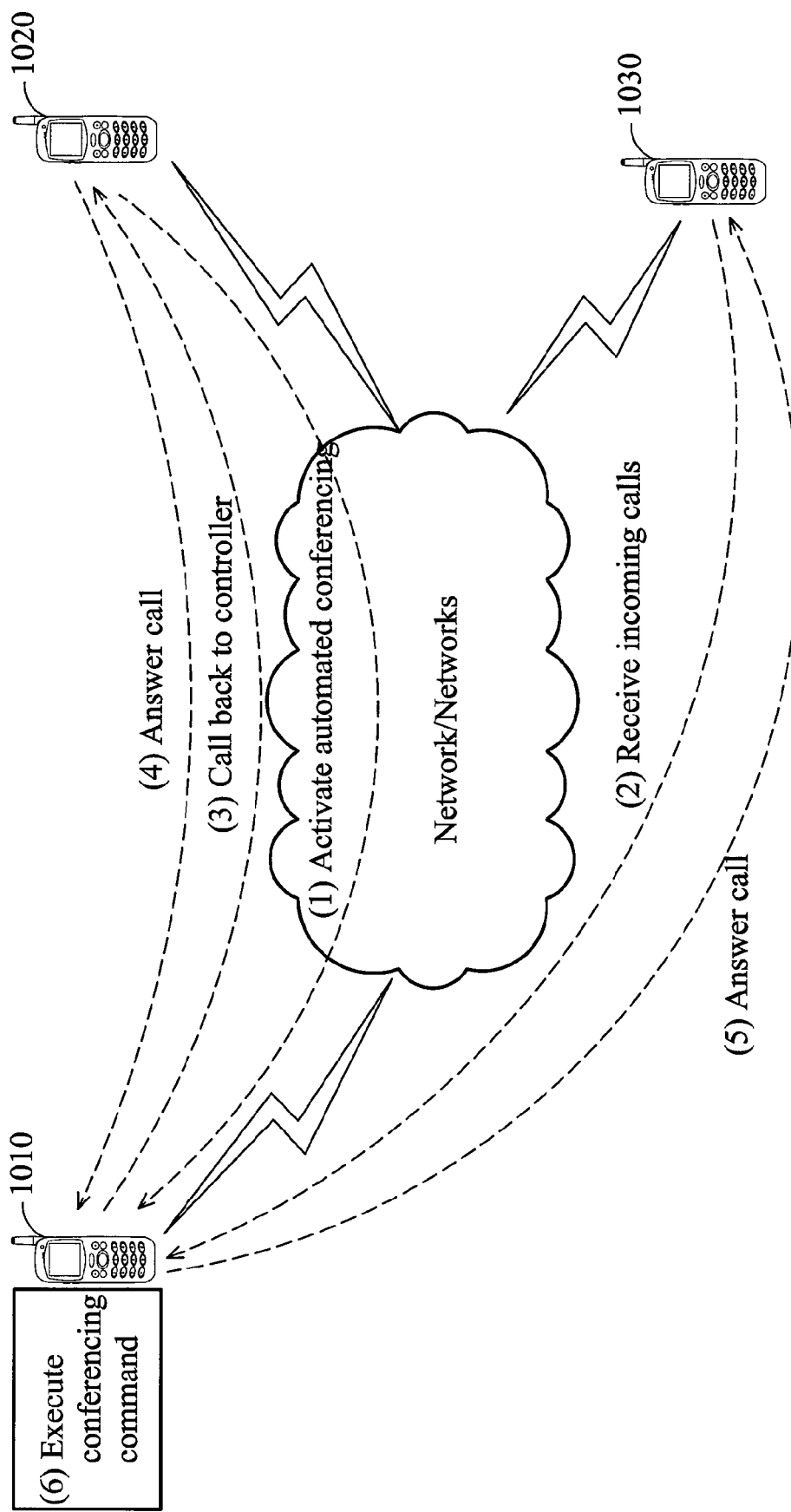

FIGS. 10a and 10b are diagrams illustrating exemplary scenarios for activating a remote mobile station to start an automated conferencing procedure when the remote mobile station receives an incoming call. In these exemplary scenarios, three mobile stations 1010, 1020 and 1030 connecting to a network are provided. The mobile station 1020 employs the described protocol and method as shown in FIGS. 2 and 3 to control the mobile station 1010 to activate an automated conferencing function thereof by issuing at least one remote control instruction with a parameter containing a callback telephone number of the mobile station 1020. When activating the automated conferencing function, the mobile station 1010 starts an automated conferencing procedure. Note that the automated conferencing procedure is predefined in the mobile station 1010. FIG. 10a illustrates details of an exemplary automated conferencing procedure. When receiving an incoming call from the mobile station 1030, the mobile station 1010 automatically answers the mobile station 1030, and calls back to the mobile station 1020 corresponding to the received callback telephone number. After receiving an answering call for the callback call from the mobile station 1010, the mobile station 1020 executes a conferencing command to enable the mobile stations 1010, 1020 and 1030 in conference, resulting in the mobile stations 1020 and 1030 to communicate therebetween. FIG. 10b illustrates details of another exemplary automated conferencing procedure. When receiving an incoming call from the mobile station 1030, the mobile station 1010 calls back to the mobile station 1020 corresponding to the received callback telephone number, and waits for an answering call. After receiving an answering call for the callback call from the mobile station 1010, the mobile station 1020 answers the received incoming call from the mobile station 1030 and executes a conferencing command to enable the mobile stations 1010, 1020 and 1030 in conference, resulting in the mobile stations 1020 and 1030 to communicate therebetween.

Methods for remotely controlling mobile stations, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for remotely controlling a mobile station by a peer terminal station, the method performed by the mobile station and comprising:
   receiving an action request comprising a remote control instruction to activate or deactivate a particular function resident on the mobile station, the remote control instruction issued by the peer terminal station;
   acquiring the remote control instruction from the received action request; and
   executing the remote control instruction to activate or deactivate the particular function resident on the mobile station,
   wherein the action request is received through a wireless telephony network, and is carried by a calling party sub-address field, a called party sub-address field, or a user-user field of a call control (CC) setup message in place of one or more CC setup parameters, and the CC setup message initiates a mobile originating call establishment.

2. The method as claimed in claim 1 further comprising:
   receiving a remote control request indicating that a remote control procedure is initiated by the peer terminal station;
   transmitting an authentication request indicating that an authentication procedure is initiated for the remote control procedure to the peer terminal station;
   receiving an authentication response corresponding to the authentication request and comprising authentication data from the peer terminal station;
   determining whether the remote control procedure is authenticated by verifying the authentication data;
   if so, transmitting a remote control acknowledgement indicating that the remote control procedure is authenticated to the peer terminal station;
   wherein the remote control acknowledgement is transmitted before receiving the action request corresponding to the remote control acknowledgement, the remote control request and the authentication response are received through the wireless network, and the authentication request and the remote control acknowledgement are transmitted via the wireless network.

3. The method as claimed in claim 2 wherein the remote control request, authentication request, authentication response or remote control acknowledgement is carried by a CC setup message initiating a mobile originating call establishment.

4. The method as claimed in claim 2 wherein the remote control request, the authentication request, the authentication response or the remote control acknowledgement is carried by a short message, an enhanced message or a multimedia message.

5. The method as claimed in claim 2 wherein the remote control request, the authentication request, the authentication response or the remote control acknowledgement is carried by a text message or a file attachment of an e-mail.

6. The method claimed in claim 2 wherein the remote control request, the authentication request, the authentication response or the remote control acknowledgement is carried by a data file.

7. The method claimed in claim 2 wherein the remote control request, the authentication request, the authentication response or the remote control acknowledgement is carried by digital text in multiple-octet coded character set (USC) or Baudot type character set.

8. The method as claimed in claim 2 further comprising:
   after the remote control procedure is authenticated, image data corresponding to a man-machine interface (MMI) displayed on a screen of the mobile station is transmitted to the peer terminal station,
   wherein the peer terminal station displays an MMI on a screen of the peer terminal station according to the received image data, enabling an user to provide the remote control instruction by interacting with the MMI displayed on the screen of the peer terminal station.

9. The method as claimed in claim 1 wherein the remote control instruction is encoded in an AT command line, and the remote control instruction is acquired by parsing the AT command line.

10. The method as claimed in claim 1 wherein the remote control instruction is contained in digital voice data, the remote control instruction is recognized by comparing the digital voice data with a plurality of predefined voice patterns stored by the mobile station, and one of the predefined voice patterns corresponds to the remote control instruction.

11. The method as claimed in claim 1 wherein the remote control instruction is represented by at least one dual-tone multi-frequency (DTMF) signal corresponding to a combination of key strokes on a keypad of the peer terminal station, and the remote control instruction is acquired by detecting the DTMF signal.

12. The method as claimed in claim 1 wherein the function is activated to start an automated conferencing procedure and the action request comprises a callback telephone number corresponding to the peer terminal station.

13. The method as claimed in claim 12 further comprising:
after starting the automated conferencing procedure, receiving an incoming call from another mobile station;
after receiving the incoming call, automatically answering the incoming call, and calling back to the peer terminal station according to the callback telephone number; and
after receiving an answer call from the peer terminal station for answering the callback call, executing a conferencing command to enable the peer terminal station and the mobile station making the incoming call to communicate therebetween.

14. The method as claimed in claim 1 wherein the remote control instruction is represented by a menu traversal path containing a series of menu items in a man-machine interface (MMI), and the remote control instruction is acquired by parsing the menu traversal path.

15. The method as claimed in claim 1 wherein the remote control instruction is represented by a function code, and the remote control instruction is acquired by parsing the function code.

16. A method for remotely controlling a mobile station by a peer terminal station, the method performed by the peer terminal station and comprising:
providing a remote control instruction to activate or deactivate a particular function resident on the mobile station; and
transmitting an action request comprising the remote control instruction to the mobile station, thereby directing the mobile station to execute the remote control instruction,
wherein the action request is transmitted via a wireless telephony network, and is carried by a calling party sub-address field, a called party sub-address field, or a user-user field of a call control (CC) setup message in place of one or more CC setup parameters, and the CC setup message initiates a mobile originating call establishment.

17. The method as claimed in claim 16 further comprising:
transmitting a remote control request indicating that a remote control procedure is initiated by the peer terminal station to the mobile station;
receiving an authentication request indicating that an authentication procedure is initiated for the remote control procedure from the mobile station;
transmitting an authentication response corresponding to the authentication request and comprising authentication data to the mobile station;
transmitting the action request to the mobile station after receiving a remote control acknowledgement indicating that the remote control procedure is authenticated and corresponding to the authentication response from the mobile station.

18. A system for remote mobile station control comprising:
a mobile station coupling to a controller via a telephony wireless network, receiving an action request comprising a remote control instruction and a callback telephone number from the controller, acquiring the remote control instruction from the received action request, executing remote control instruction to activate a function resident on the mobile station to start an automated conferencing procedure in response to a future incoming call from another mobile station,
wherein the action request is received through a wireless telephony network, and is carried by a calling party sub-address field, a called party sub-address field, or a user-user field of a call control (CC) setup message in place of one or more CC setup parameters, and the CC setup message initiates a mobile originating call establishment; and
wherein the automated conferencing procedure is responsible for automatically answering the future incoming call, and subsequently calling back to the controller according to the callback telephone number, and executing a conferencing command to enable the controller and the mobile station making the incoming call to communicate therebetween after the controller answers the callback call.

19. The system as claimed in claim 18 wherein the mobile station further receives a remote control request indicating that a remote control procedure is initiated by the controller, transmits an authentication request indicating that an authentication procedure is initiated for the remote control procedure to the controller, receives an authentication response corresponding to the authentication request and comprising authentication data from the controller, determines whether the remote control procedure is authenticated by verifying the authentication data, and, if so, transmits a remote control acknowledgement indicating that the remote control procedure is authenticated to the controller, the remote control acknowledgement is transmitted before receiving the action request corresponding to the remote control acknowledgement, the remote control request and the authentication response are received through the wireless network, and the authentication request and the remote control acknowledgement are transmitted via the wireless network.

20. The system as claimed in claim 19 wherein the action request, the remote control request, the authentication request, the authentication response or the remote control acknowledgement is carried by a call control (CC) setup message initiating a mobile originating call establishment.

21. The system as claimed in claim 19 wherein the action request, remote control request, authentication request, authentication response or remote control acknowledgement is carried by a short message (SM), an enhanced message (EM) or a multimedia message (MM), and transmitted via a plurality of intermediary devices supporting SM, EM or MM services.

22. The system as claimed in claim 19 wherein the action request, the remote control request, the authentication request, the authentication response or the remote control acknowledgement is carried by a data file and the data file is transmitted via a plurality of intermediary devices supporting file transfer protocol (FTP).

23. The system as claimed in claim 19 wherein the action request, the remote control request, the authentication request, the authentication response or the remote control acknowledgement is carried by digital text in multiple-octet coded character set (USC) or Baudot type character set and is received by a cellular text telephone modem (CTM) of the controller or the mobile station.

24. The system as claimed in claim 19 wherein the mobile station further transmits image data corresponding to a man-machine interface (MMI) displayed on a screen of the mobile station to the controller after the remote control procedure is authenticated, and the controller displays an MMI on a screen of the controller according to the received image data, enabling an user to provide the remote control instruction by interacting with the MMI displayed on the screen of the controller.

25. The system as claimed in claim 18 wherein the remote control instruction is encoded in an AT command line, represented by a menu traversal path containing a series of menu items in a man-machine interface (MMI), or represented by a function code, and the mobile station acquires the remote control instruction by parsing the AT command line, the menu traversal path or the function code.

26. The system as claimed in claim 18 wherein the remote control instruction is contained in digital voice data, mobile station recognizes the remote control instruction by comparing the digital voice data with a plurality of predefined voice patterns stored by the mobile station, and one of the predefined voice patterns corresponds to the remote control instruction.

27. The system as claimed in claim 18 wherein the remote control instruction is represented by at least one dual-tone multi-frequency (DTMF) signal corresponding to a combination of key strokes on a keypad of the controller, and the mobile station acquires the remote control instruction by detecting the DTMF signal.

* * * * *